United States Patent
Bortolotto et al.

(10) Patent No.: US 11,857,988 B2
(45) Date of Patent: Jan. 2, 2024

(54) FLEXIBLE PAINTING PLANTS

(71) Applicant: GEICO S.p.A., Cinisello Balsamo (IT)

(72) Inventors: Pietro Bortolotto, Cinisello Balsamo (IT); Valerio Iglio, Cinisello Balsamo (IT)

(73) Assignee: GEICO S.p.A., Cinisello Balsamo (IT)

( * ) Notice: Subject to any disclaimer, the term of this patent is extended or adjusted under 35 U.S.C. 154(b) by 0 days.

(21) Appl. No.: 17/782,250

(22) PCT Filed: Dec. 10, 2020

(86) PCT No.: PCT/IB2020/061720
§ 371 (c)(1),
(2) Date: Jun. 3, 2022

(87) PCT Pub. No.: WO2021/116951
PCT Pub. Date: Jun. 17, 2021

(65) Prior Publication Data
US 2023/0010454 A1 Jan. 12, 2023

(30) Foreign Application Priority Data

Dec. 11, 2019 (IT) .......................... 102019000023613

(51) Int. Cl.
*B05B 12/14* (2006.01)
*B05B 13/04* (2006.01)

(52) U.S. Cl.
CPC ...... *B05B 12/1463* (2013.01); *B05B 13/0452* (2013.01)

(58) Field of Classification Search
USPC ....... 118/300, 323, 321, 326, 309, 634, 501, 118/62
See application file for complete search history.

(56) References Cited

U.S. PATENT DOCUMENTS 4,732,278 A * 3/1988 Zangenfeind ........ G03D 13/001
198/463.6
6,071,346 A * 6/2000 Yamauchi ........... B05B 12/1463
118/302

(Continued)

FOREIGN PATENT DOCUMENTS

EP 0895485 B1 2/1999
EP 1566221 A2 8/2005

(Continued)

OTHER PUBLICATIONS

International Search Report and Written Opinion in corresponding International Application No. PCT/IB2020/061720 dated Feb. 18, 2021, 11 pages.

*Primary Examiner* — Yewebdar T Tadesse
(74) *Attorney, Agent, or Firm* — MH2 Technology Law Group LLP

(57) ABSTRACT

A painting plant may include: at least one painting booth including a painting system configured to apply paint onto objects in the at least one painting booth; a magazine including cartridges containing the paint; and a system configured to automatically transport the cartridges from the magazine to feeding stations which feed the paint from the cartridges to the painting system in the at least one painting booth. In addition or in the alternative, a painting plant may include: at least one painting booth including a painting system configured to apply paint onto objects in the at least one painting booth; a magazine including cartridges containing cleaning liquid; and a system configured to automatically transport the cartridges containing the cleaning liquid from the magazine to feeding stations which feed the cleaning liquid from the cartridges containing the cleaning liquid to the painting system in the at least one painting booth.

20 Claims, 2 Drawing Sheets

(56) References Cited

U.S. PATENT DOCUMENTS

| | | | | |
|---|---|---|---|---|
| 6,179,217 | B1* | 1/2001 | Yoshida | B08B 9/00 |
| | | | | 239/223 |
| 8,109,228 | B2* | 2/2012 | Umezawa | B25J 15/0019 |
| | | | | 222/326 |
| 2022/0168769 | A1* | 6/2022 | Rodrigues | B05B 15/58 |

FOREIGN PATENT DOCUMENTS

| | | |
|---|---|---|
| FR | 2638724 A1 | 5/1990 |
| WO | 1997/034707 A1 | 9/1997 |
| WO | 1997/040946 A1 | 11/1997 |

\* cited by examiner

FLEXIBLE PAINTING PLANTS

CROSS-REFERENCE TO RELATED APPLICATION(S)

This application is a national stage entry from International Application No. PCT/IB2020/061720, filed on Dec. 10, 2020, in the Receiving Office ("RO/IB") of the World Intellectual Property Organization ("WIPO"), published as International Publication No. WO 2021/116951 A1 on Jun. 17, 2021. International Application No. PCT/IB2020/061720 claims priority under 35 U.S.C. § 119 from Italian Patent Application No. 102019000023613, filed on Dec. 11, 2019, in the Italian Patent and Trademark Office ("IPTO"), the entire contents of all of which are incorporated herein by reference.

The present invention relates to an innovative painting plant.

In the prior art painting plants with painting booths in which painting systems apply the paint onto the surfaces of the objects to be painted, for example motor vehicle bodies, are known. In the automated plants the painting systems comprise painting devices or guns which are moved by suitably programmed robotized arms, while in the case of touch-up work or small-scale production a human operator may also be required to manually operate a special manual paint spray gun.

In plants of a certain size the painting system of a booth (or of several booths) is connected to a special centralized paint source, often called a "colour centre". Usually this "colour centre", which contains large paint containers, is arranged far from the booths (for example also so as to be able to serve several booths at the same time) and is connected to the painting system by means of long ducts for feeding the paint.

A first problem of such plants is that of avoiding drying or a variation in density of the paint inside the long feed ducts, in particular owing to plant stoppage times (for example so that maintenance of the booths may be carried out).

Moreover, in the case of a change of colour of the paint to be applied, it is necessary to ensure that no traces of the preceding paint remain within the whole plant. In the known painting plants, therefore, automatic or semi-automatic cleaning plants have been proposed, these performing on command the cleaning of the entire paint distribution system and the painting system. These cleaning plants are for example operated when a relatively long stoppage of the painting plant is planned and/or before a painting cycle with a different colour is started.

Usually the known cleaning systems perform the discharging of any paint left inside the plant and the circulation of a suitable cleaning liquid which is sent from the colour centre along all the paint feed ducts and then evacuated through the painting system in the booth, spraying it into special recovery containers. This obviously results in the use of a lot of cleaning liquid which, after being used, must be disposed of as special waste, both because it contains the removed paint and because often it is a chemical solvent which is harmful for the environment. There are therefore relatively high costs associated with consumable material and plant management.

Moreover, at the end of the cleaning cycle it must be ensured that within the plant there is no trace of the cleaning liquid which could alter the paint at the start of the new painting cycle. In the plant therefore further washing must be performed, this generally being done by introducing a first quantity of paint which must dispensed "one off" in order to eliminate any trace of the cleaning liquid. This results in further costs associated with consumable material and disposal operations.

In any case, the operations for cleaning and restoring the operativity of the plant with a new paint involve fairly long plant downtime.

Moreover, the minimum quantity of paint of a particular colour which can be managed by the plant is determined by the quantity of paint which is needed to fill the entire plant. This quantity may be on occasions excessive and may result in a not indifferent amount of waste paint at the end of painting. Moreover, the paint containers of a colour centre of the known type generally contain at least 20-25 litres and therefore are heavy and difficult to manage.

In order to attempt to reduce the downtime and the quantity of consumable material (both paint and cleaning liquid) used in the painting plants, in the prior art it has been proposed sending along the plant an insert which travels inside the tubes and separates into segments the fluids which flow inside the tubes of the plant. In this way, a segment of paint may be followed by a segment of cleaning liquid and then another segment of paint, keeping separate the various segments owing to the arrangement of an insert in between.

This enables the quantity of cleaning liquid and paint with a predetermined colour to be reduced and partly overcomes the aforementioned problems, but does not eliminate them entirely. Moreover, it becomes necessary to manage the introduction and the removal of the inserts from the pipes and ensure the hydraulic separation between the various segments. The dirty inserts must in turn be cleaned and/or disposed of.

In the prior art it has also been proposed to use paint containers transported from a colour warehouse and inserted into the painting stations or painting robots and then brought back and refilled. One of the conveyor systems can be for example a pneumatic system that sends the containers through ducts.

However, the management of the containers in known plants is rather complex. EP1566221 discloses a coating robot provided with an exchangeable cartridge storing paint therein.

WO97/34707 discloses a plant having a rotatable magazine for a multitude of interchangeable containers for a coating machine which containers are filled at a location separated from the coating machine and are removed from the magazine at a discharge point and supplied to the coating machine and, after use, are again returned to the magazine.

EP0895485 discloses a plant for coating objects in which cartridge sorting and storing rack have a plurality of cartridges. Conveyor means consists of a ring-shaped, tubular system in which full cartridges are conveyed to a docking station and applicator and back, so that a circular circuit has to be provided for the cartridges.

The general object of the present invention is to overcome the problems of the prior art mentioned above, by providing a flexible painting plant with more rapid and effective management of the colours and internal cleaning of the plant.

In view of this object the idea which has occurred, according to the invention, is to provide a cleaning plant comprising at least one painting booth containing a painting system intended to apply paint onto objects placed in the booth, characterized in that it comprises a magazine containing a plurality of cartridges containing paint, a system for automatically transporting the cartridges from the store to at least one arrival station close to the booth and feeding stations which remove the paint from the cartridges and feed it to the painting system in the booth.

Still according to the invention, the idea which has occurred is to provide a method for feeding paint to painting systems inside painting booths, comprising the steps of preparing cartridges containing paint, supplying a magazine with these cartridges and providing a system for automatically transporting cartridges from the magazine towards the booths so as to supply in the vicinity of the booths the cartridges to be used in the booth painting systems.

The transport system may be advantageously of the pneumatic type.

The magazine may be advantageously of the automatic type.

Moreover, further cartridges containing cleaning liquid may be provided in the magazine so as to send them as an alternative to the cartridges containing paint and use them for cleaning parts of the painting system which have come into contact with the paint.

As is well described below, the paint cartridges are treated as "consumable" elements that are expelled from the plant once used.

In order to illustrate more clearly the innovative principles of the present invention and its advantages compared to the prior art, examples of embodiment applying these principles will be described below with the aid of the accompanying drawings.

Figure 1:
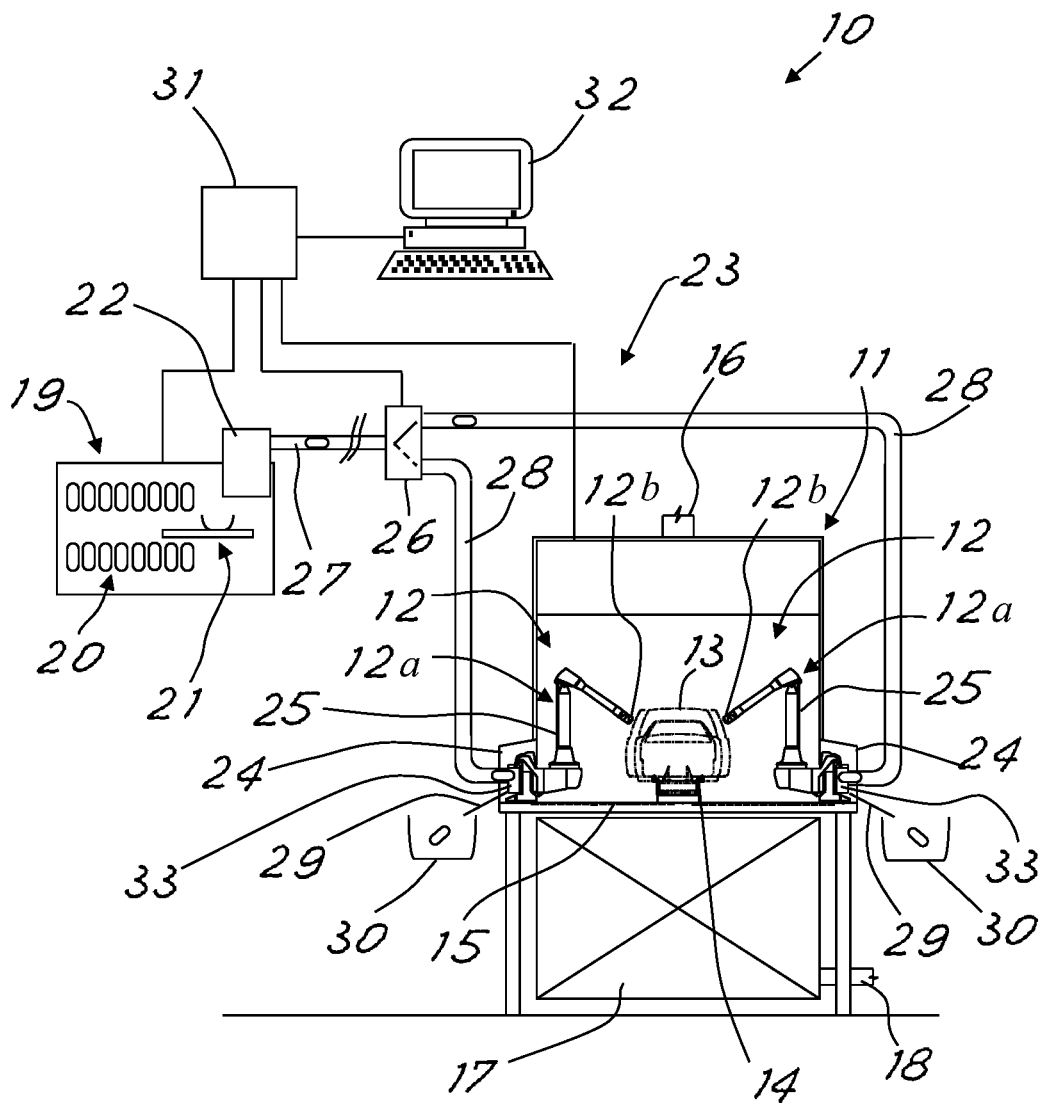
FIG. 1 shows in schematic form a first plant according to the invention.

With reference to the figures, FIG. 1 shows a plant according to the invention, denoted generally by 10.

This plant 10 comprises at least one painting booth 11 in which there are one or more painting systems 12 for painting objects 13, for example in particular motor vehicle bodies or parts thereof, which are conveyed into the at least one painting booth 11 preferably by means of a sequential transportation line 14 (for example a suitable and known sequential chain, roller or similar conveyor). The painting systems 12 may be manual systems with paint application devices 12b (for example paint spray guns) or, for example, may comprise one or more painting robots 12a (advantageously of the anthropomorphic arm type) provided at the end with a suitable paint application device 12b (for example a suitable paint spray gun). Below, for the sake of simplicity, reference will be made to paint application devices 12b (of both the manual and automatically operated type) using the term "paint spray gun", it being understood, however, that this term may mean any known paint application device 12b, as will be obvious to the person skilled in the art.

The at least one painting booth 11 has advantageously a grille-type floor 15 for allowing the throughflow of the overspray (namely the atomized paint inside the at least one painting booth 11 which has not become attached to the object to be painted) which is preferably transported by an air flow which is introduced via the ceiling of the at least one painting booth 11 through an inlet duct 16 and which exits through the grille-type floor 15 so as to convey the air with the overspray into a known abatement system 17 for eliminating the overspray (for example by means of filters, water jets or other means well-known in the sector) which separates the overspray from the air flow. The air cleaned of the overspray then exits the abatement system 17, for example through one or more ducts 18, and is then introduced into the surrounding environment and/or conveyed back into the at least one painting booth 11 through the inlet duct 16. Special ventilators (not shown) move the air flow.

Such a structure for the at least one painting booth 11 is well-known to the person skilled in the art and therefore will not be further shown or described.

The plant 10 comprises an automatic magazine 19 which receives inside special seats a plurality of cartridges 20 (e.g., color) so as to select them and release them on command. The automatic magazine 19 may be of the type known per se for receiving, selecting and releasing objects on command.

Close to the automatic magazine 19 or inside the automatic magazine 19 there is a starting station 22 of a transport system 23 for automatically transporting the cartridges 20 from the starting station 22 to at least one arrival station 33. The automatic magazine 19 may for example release and automatically insert into the starting station 22 a selected cartridge 20. The automatic magazine 19 may for example be provided with a system 21 for selecting and picking up a cartridge 20 from the plurality of cartridges 20 present in the automatic magazine 19 and insert the cartridge 20 directly into the starting station 22 of the transport system 23 for automatically transporting the cartridge 20 toward the at least one painting booth 11, as far as a suitable the at least one arrival station 33.

The transport system 23 for automatically transporting the cartridges 20 may be advantageously realized as a pneumatic transport system 23, with each cartridge 20 which is transported along the system (formed by suitable ducts) by means of a suitable air flow.

The at least one painting booth 11 has, associated with it, at least one feeding station 24 which feeds the paint from the cartridge 20 to the painting system 12 present in the at least one painting booth 11. In an automatic transport system 23, a cartridge 20 transported from the automatic magazine 19 to the at least one arrival station 33 of the transport system 23 may be directly introduced from the at least one arrival station 33 into the at least one feeding station 24.

In this case, the at least one feeding station 24 comprises or advantageously forms also the at least one arrival station 33 of the transport system 23 and is designed to receive a cartridge 20 sent from the automatic magazine 19 through the transport system 23 and to connect the cartridge 20 automatically to the associated painting system 12 so as to send to the associated painting system 12 a flow of paint removed from the cartridge 20.

Advantageously, at least one arrival station 33 and/or at least one feeding station 24 may be associated with each paint spray gun and/or each painting robot 12a.

The at least one feeding station 24 may be situated in the vicinity of the painting station and a short duct 25 may convey the paint from the cartridge 20 (e.g., color) contained inside the at least one feeding station 24 to the paint spray gun. For example, the at least one feeding station 24 may be situated in the proximity or in the base of the painting robot 12a such that the mass which the painting robot 12a must move remains in any case small.

Alternatively, the station may be located closer to the paint spray gun and the duct 25 may consequently be shorter. If need be, the duct 25 may be eliminated and the cartridge 20 may reach and be engaged inside the paint spray gun which with the cartridge 20 thus forms also the at least one arrival station 33 and the at least one feeding station 24.

In any case, a controlled operation system for cleaning the paint along the section connecting together the cartridge 20 and the paint spray gun may be provided in the at least one feeding station 24 or connected thereto. This controlled operation system may for example employ a controlled circulation of a suitable cleaning liquid. The quantity of cleaning liquid may be kept small since the parts of the plant which come into contact with the paint are few and have small dimensions.

It may also be advantageously envisaged inserting into the automatic magazine 19 also cartridges 20 containing a cleaning liquid (e.g., cleaning), in addition to cartridges 20 containing paint (e.g., color). In this way, when cleaning is required, a cartridge 20 (e.g., cleaning) may be sent to the at least one arrival station 33 instead of a cartridge 20 (e.g., color) so that the cleaning liquid may be circulated where the paint first circulated. As a result it is possible to avoid having a separate circuit for managing the cleaning liquid and the cleaning system is simplified. It is in fact merely necessary for the painting system 12 to emit the cleaning liquid into a special zone of the at least one painting booth 11 (for example inside a recovery container (not shown)) like those using the paint.

The transport system 23 may comprise suitable routing units 26 for sending on command the cartridges 20 from the starting station 22 in the automatic magazine 19 to a selected arrival station 33 of the at least one painting booth 11.

Advantageously a first duct 27 may be provided, said duct leading from the starting station 22 to a routing unit 28 which routes the cartridges 20 into a plurality of ducts 28 each directed toward an arrival station 33. Several routing units may be provided for further routing the cartridges 20 toward a plurality of painting booths 11 and/or painting systems 12 inside the painting booths 11.

In the case of pneumatic transport, the starting station 22 may produce an adequate flow of air for pushing the cartridges 20 along the ducts of the system and the routing unit 26 may comprise a mobile selector which connects on command the inlet duct 27 alternately to a desired outlet duct 28, so as to allow a cartridge 20 arriving at the routing unit 26 to be introduced without difficulty into the desired duct 28 and thus continue toward the selected arrival station 33.

In order to facilitate the pneumatic displacement of the cartridges 20, the cartridges 20 may have a transverse diameter slightly smaller than the internal diameter of the ducts of the transport system 23 and optionally may also comprise circumferential sealing rings in the proximity of their ends, as substantially known in the case of pneumatic postal systems.

If required, the cartridges 20 may also have edges of the front and rear ends which are rounded. The rear end of the cartridges 20 may have a substantially flat surface so as to obtain a better pneumatic thrust. The front end may have a rounded surface for favoring the sliding movement of the cartridge 20 along the ducts also in the case of relatively tight bends along the path.

If required, in addition to a pneumatic thrust, it may also be envisaged providing an opposite vacuum force which sucks the cartridges 20 toward their destination.

The cartridges 20 may have an engaging valve (for example on their front end) for automatic engagement with the paint feeding circuit present in the at least one feeding station 24.

Alternatively, the cartridges 20 may have a zone which can be perforated and the circuit present in the at least one feeding station 24 for feeding the paint to the painting system 12 may comprise a system for perforating the cartridge 20 so as to introduce a duct for removing the paint through this zone.

The cartridge 20 may for example be made in the form of a can and have a wall part which is sufficiently weak for it to be perforated by the removal duct made for example with a suitable pointed shape.

The perforatable zone may also be made of a material different from the rest of the cartridge 20. For example, this zone may be made with a membrane made of elastomeric material which may be more easily perforated and which, if desired, may also provide a hydraulic seal after extraction of the removal duct from the cartridge 20, so as to prevent the spread externally of any residual paint which may be left inside the cartridge 20.

Preferably, the at least one feeding station 24 may also expel the empty cartridge 20, for example via a chute 29 which leads into a collection container 30. The used cartridges 20 are thus quickly ejected from the plant to be eliminated.

The plant may be advantageously managed by a control system 31, which is for example made with a suitably programmed electronic controller, known per se, and which may also comprise one or more terminals 32 for displaying information about the plant and the introduction of any commands by an operator.

The control system 31 may for example be programmed to send to a desired painting system 12 (for example a particular painting robot 12a) a cartridge 20 containing the desired color from among those colours colors available in the cartridges 20 present in the automatic magazine 19, detecting also when a cartridge 20 is empty so that another replacement cartridge 20 of the same color or with a different color can be sent, as required.

In the event a change in color, the control system may also control operation of the cleaning system so as to eliminate traces of the previous color before using the color of the new cartridge 20. In the case where cartridges 20 (e.g., cleaning) as mentioned above are used, the control system may perform cleaning in a very simple manner, retrieving from the automatic magazine 19 a cartridge 20 (e.g., cleaning) before the cartridge 20 (e.g., cleaning) with the new color and performing withdrawal and emission of the cleaning liquid in the zone where the paint was previously circulating.

Figure 2:
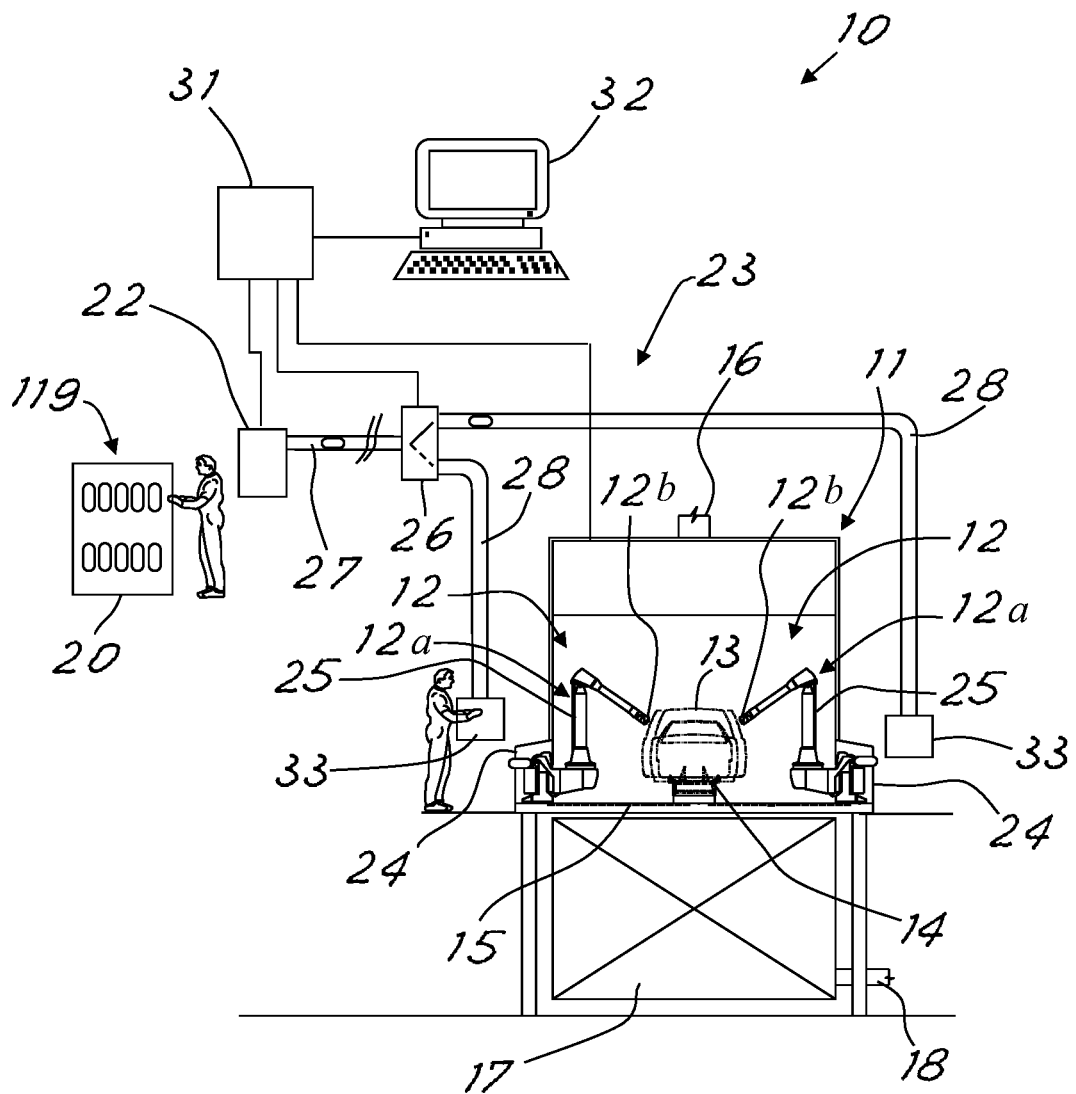
FIG. 2 shows in schematic form another plant according to the invention.

FIG. 2 shows a simplified variant of a plant according to the invention. Parts similar to those shown in FIG. 1 are indicated in FIG. 2 using the same numbering as in FIG. 1 and, except where differently indicated below, for these parts reference may be made to the description provided above.

Basically, the plant 10 according to FIG. 2 always comprises at least one painting booth 11 containing one or more automatic or manual painting systems 12 for painting objects 13, for example in particular motor vehicle bodies or parts thereof, which are conveyed into the at least one painting booth 11 preferably by means of the sequential transportation line 14. The at least one painting booth 11 may have a grille-type floor 15 and an air circulation and filtration system 16, 17, 18 (e.g., inlet duct 16, abatement system 17, and one or more ducts 18) for eliminating the overspray. The at least one painting booth 11 has at least one feeding station 24 for feeding the paint from the cartridges 20 inserted inside the at least one feeding station 24 to the painting devices inside the at least one painting booth 11.

The plant comprises a manual magazine 119 inside which the cartridges 20 (e.g., color) are stored. In the proximity of the manual magazine 119 there is the starting station 22 of the transport system 23 which transports the cartridges 20 to the at least one arrival station 33 so that they can be transferred and inserted into the corresponding feeding station 24.

In the version of the plant 10 shown in FIG. 2, the transfer of the cartridges 20 from the manual magazine 119 to the starting station 22 may be performed manually by an operator, who removes a cartridge 20 from the manual magazine 119 and inserts it into the starting station 22. The choice of the cartridge 20 may for example be indicated to the operator by the control system 31 via a terminal 32.

Similarly, the transfer of the cartridges 20 from the at least one arrival station 33 to the at least one feeding station 24 may be performed manually by an operator who removes the cartridge 20 which has arrived at the at least one arrival station 33 and inserts the cartridge 20 inside the at least one feeding station 24.

Owing to the plant described, once a cartridge 20 in the at least one feeding station 24 is empty, a new cartridge 20 may be automatically requested by the control system 31 or by an operator at the at least one painting booth 11. An operator at the manual magazine 119 may remove from the manual magazine 119 a cartridge 20 containing a suitable color, insert the cartridge 20 into the starting station 22 and send it via the transport system 23 to the at least one arrival station 33 from where the cartridge 20 may be removed by an operator and inserted into the at least one feeding station 24 of the painting system 12 waiting for the paint, after extraction of the empty cartridge 20. All of this may be performed in a rapid and easy manner.

At this point it is clear how the objects of the invention have been achieved. Owing to the system according to the invention it becomes simple to obtain a painting plant 10 which may change color very rapidly and perform also short painting operations with a particular color and then change to a new color without wastage of material. For example, the cartridges 20 may have small dimensions (also only 0.1 to 2 litres) and, if a greater capacity is required in order to paint for a longer period of time using the same color, it is sufficient to recall in succession the cartridges 20 containing paint of the same color.

The cartridges 20 may be made of low-cost recyclable materials and may be of the disposable type or the type which can be reused several times by filling them again. For example, the cartridges 20 may be made of cardboard, aluminium, plastic, etc.

As clear from the above description, the cartridges 20 are used substantially as "consumables" which are sent to the painting system 12 from the warehouse and then once the paint has been consumed, they are ejected directly, as substantially "disposable" elements.

The magazine whether it be an automatic magazine 19 or a manual magazine 119, may be easily filled manually by an operator, in view also of the low weight which the single cartridges 20 may have.

Obviously the description given above of embodiments applying the innovative principles of the present invention is provided by way of example of these innovative principles and must therefore not be regarded as limiting the scope of the rights claimed herein.

For example, depending on the requirements, several painting booths 11 may be fed by several magazines (one or more automatic magazines 19 and/or one or more manual magazines 119) or several magazines (one or more automatic magazines 19 and/or one or more manual magazines 119) may be used in order to supply the cartridges 20 to a single painting booth 11 or group of painting booths 11. Each automatic magazine 19 or manual magazine 119 may obviously be of any desired size and house any number of cartridges 20.

The paints used may be of various types and different methods used to apply them onto the object to be painted. For example, the paints may also be in powder form as well as liquid form and may be applied by the paint spray guns using pressurized spray nozzles, electrostatic methods, etc.

Owing to the invention, a same magazine (e.g., an automatic magazine 19 or a manual magazine 119) may contain also cartridges 20 with paints of a different type together with any suitable corresponding different cleaning liquids and the plant 10 may use the different paints and liquids in any case, in a rapid and efficient manner, depending on the requirements.

The painting systems 12 inside the painting booths 11 may be different from those shown in the drawings. For example, the paint spray guns inside the painting booths 11 may be moved using systems different from those shown. For example, painting robots 12a without anthropomorphic arms may be used or the paint spray guns may be simply manually operated by human operators. It is also possible to envisage having separate—automatic 19 or manual 119—magazines for the cartridges 20 containing paint (e.g., color) and for the cartridges 20 containing the cleaning liquids (e.g., cleaning).

Finally, parts described for the embodiment shown in FIG. 1 may also be used for the embodiment shown in FIG. 2. For example, in FIG. 2, an automatic magazine 19 may be used instead of the manual magazine 119 so as to supply automatically the cartridges 20 directly to the starting station 22 or to the operator who must transfer them to the starting station 22. In the plant 10 according to FIG. 1, the at least one arrival station 33 and the at least one feeding station 24 which are separate and with an operator who transfers the cartridges 20 from the at least one arrival station 33 to the at least one feeding station 24 may also be used, as shown in FIG. 2.

The invention claimed is:

1. A painting plant, comprising:
    at least one painting booth comprising a painting system configured to apply paint onto objects in the at least one painting booth;
    a magazine comprising a plurality of cartridges containing the paint; and
    a transport system configured to automatically transport the cartridges from the magazine to at least one feeding station configured to feed the paint from the cartridges to the painting system in the at least one painting booth;
    wherein the transport system comprises:
        a starting station, near the magazine, configured to send the cartridges from the magazine; and
        at least one arrival station, next to the at least one painting booth, configured to receive the cartridges;
    wherein the transport system is a pneumatic transport system comprising ducts,
    wherein the cartridges are transported along the ducts using air flow, and
    wherein the at least one arrival station comprises an exit from which to expel empty cartridges into a collection chamber, for elimination of the empty cartridges from the painting plant after use.

2. The painting plant of claim 1, wherein the magazine is an automatic magazine.

3. The painting plant of claim 1, wherein the magazine is an automatic magazine, and
    wherein the automatic magazine introduces the cartridges directly into the starting station.

4. The painting plant of claim 1, wherein the at least one arrival station introduces the cartridges directly into the at least one feeding station.

5. The painting plant of claim 1, wherein the at least one feeding station forms or comprises the at least one arrival station.

6. The painting plant of claim 1, wherein the painting system comprises application devices connected to the at least one feeding station by a duct for the paint.

7. The painting plant of claim 6, wherein the application devices are moved by robot arms, and
wherein each of the robot arms is associated with a respective arrival station.

8. The painting plant of claim 1, further comprising:
a plurality of arrival stations;
wherein the transport system comprises at least one routing unit, between the starting station and the plurality of arrival stations, for sequentially receiving the cartridges from the magazine and routing the cartridges on command toward a selected arrival station of the plurality of arrival stations.

9. The painting plant of claim 1, wherein the magazine further comprises cartridges containing cleaning liquid to be used as an alternative to the cartridges containing the paint, and
wherein the cartridges containing the cleaning liquid are configured to feed the cleaning liquid to the painting system instead of the paint.

10. The painting plant of claim 1, wherein the transport system uses pneumatic thrust.

11. The painting plant of claim 1, wherein the transport system uses vacuum force.

12. The painting plant of claim 1, wherein the transport system uses pneumatic thrust and vacuum force.

13. A painting plant, comprising:
at least one painting booth comprising a painting system configured to apply paint onto objects in the at least one painting booth;
a magazine comprising a plurality of cartridges containing the paint; and
a transport system configured to automatically transport the cartridges from the magazine to at least one feeding station configured to feed the paint from the cartridges to the painting system in the at least one painting booth;
wherein the transport system comprises:
a starting station, in the magazine, configured to send the cartridges from the magazine; and
at least one arrival station, next to the at least one painting booth, configured to receive the cartridges;
wherein the transport system is a pneumatic transport system comprising ducts,
wherein the cartridges are transported along the ducts using air flow, and
wherein the at least one arrival station comprises an exit from which to expel empty cartridges into a collection chamber, for elimination of the empty cartridges from the painting plant after use.

14. The painting plant of claim 13, wherein the magazine is an automatic magazine.

15. The painting plant of claim 13, wherein the at least one feeding station forms or comprises the at least one arrival station.

16. The painting plant of claim 13, wherein the magazine further comprises cartridges containing cleaning liquid to be used as an alternative to the cartridges containing the paint, and
wherein the cartridges containing the cleaning liquid are configured to feed the cleaning liquid to the painting system instead of the paint.

17. A painting plant, comprising:
at least one painting booth comprising a painting system configured to apply paint onto objects in the at least one painting booth;
a magazine comprising a plurality of cartridges containing the paint; and
a transport system configured to automatically transport the cartridges from the magazine to at least one feeding station configured to feed the paint from the cartridges to the painting system in the at least one painting booth;
wherein the transport system comprises:
a starting station, at the magazine, configured to send the cartridges from the magazine; and
at least one arrival station, next to the at least one painting booth, configured to receive the cartridges;
wherein the transport system is a pneumatic transport system comprising ducts,
wherein the cartridges are transported along the ducts using air flow, and
wherein the at least one arrival station comprises an exit from which to expel empty cartridges into a collection chamber, for elimination of the empty cartridges from the painting plant after use.

18. The painting plant of claim 17, wherein the magazine is an automatic magazine.

19. The painting plant of claim 17, wherein the at least one feeding station forms or comprises the at least one arrival station.

20. The painting plant of claim 17, wherein the magazine further comprises cartridges containing cleaning liquid to be used as an alternative to the cartridges containing the paint, and
wherein the cartridges containing the cleaning liquid are configured to feed the cleaning liquid to the painting system instead of the paint.

* * * * *